(12) United States Patent
Ricks

(10) Patent No.: US 7,610,803 B2
(45) Date of Patent: Nov. 3, 2009

(54) ROBUST MEMS FLOW DIE WITH INTEGRATED PROTECTIVE FLOW CHANNEL

(75) Inventor: Lamar F. Ricks, Lewis Center, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/326,539

(22) Filed: Dec. 2, 2008

(65) Prior Publication Data

US 2009/0145243 A1 Jun. 11, 2009

Related U.S. Application Data

(63) Continuation of application No. 11/948,188, filed on Nov. 30, 2007, now Pat. No. 7,513,149.

(51) Int. Cl.
*G01F 1/68* (2006.01)
(52) U.S. Cl. .................................................. 73/204.26
(58) Field of Classification Search ............. 73/204.26, 73/204.22, 204.23
See application file for complete search history.

(56) References Cited

U.S. PATENT DOCUMENTS

| | | | | |
|---|---|---|---|---|
| 5,027,499 A | * | 7/1991 | Prohaska | ...................... 29/595 |
| 5,165,292 A | * | 11/1992 | Prohaska | ...................... 73/866 |
| 7,258,003 B2 | * | 8/2007 | Padmanabhan et al. | .. 73/204.26 |

* cited by examiner

*Primary Examiner*—Jewel Thompson
(74) *Attorney, Agent, or Firm*—Richard H. Krukar; Luis M. Ortiz; Kermit D. Lopez

(57) ABSTRACT

A MEMS flow sensor has a flow channel that avoids wire bond pads and ancillary circuit elements. A fluid can move from the bottom of the sensor substrate, though an inlet hole, over a sensing element on the top of the substrate, and then through an outlet hole. The inlet hole and the outlet hole can pass from the substrate top to the substrate bottom. A top cap can be fixed to the top of the substrate such that it covers the sensing element, the inlet hole, and the outlet hole. The top cap constrains the flow channel and keeps fluid, either gaseous or liquid, from exiting the channel and contacting the wire bond pads or ancillary circuit elements.

20 Claims, 3 Drawing Sheets

ROBUST MEMS FLOW DIE WITH INTEGRATED PROTECTIVE FLOW CHANNEL

CROSS REFERENCE TO RELATED APPLICATIONS

This patent application is a continuation application of U.S. patent application Ser. No. 11/948,188 filed Nov. 30, 2007 now U.S. Pat. No. 7,513,149 entitled "ROBUST MEMS FLOW DIE WITH INTEGRATED PROTECTIVE FLOW CHANNEL".

TECHNICAL FIELD

Embodiments relate to packaging, semiconductor packaging, and sensor packaging. Embodiments also relate to semiconductor processing, MEMS processing, micro technology and nano technology. Embodiments further relate to sensors such as flow sensors.

BACKGROUND OF THE INVENTION

Processing techniques that are similar or equivalent to semiconductor processing techniques are often used to produce sensors on substrates. The substrate has a top surface and a bottom surface with sensing elements, wire bond pads and ancillary circuits usually formed or fixed on the top surface. The ancillary circuits often include resistors, amplifiers, and transistors. The substrates themselves can be quartz, glass, silicon, or other materials.

Those practiced in the art of semiconductor processing know of many techniques and processes for producing circuitry and sensors on substrates. They also know of techniques and process for digging deep trenches or holes in a substrate. In some cases the trenches or holes go entirely through the substrate. Holes passing completely through a substrate have been used for making electrical connections between the top and the bottom of the substrate. One reason for electrically connecting the top and the bottom substrate surfaces is that wire bond pads can be placed on the bottom of the substrate.

Many sensors suffer from the problem of having the ancillary circuitry, and bond pads exposed to the same environment as the sensing element. This can be a considerable problem when the environment is caustic or otherwise harsh. Systems and methods addressing the shortcomings of current technology are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments that a substrate comprising glass, quartz, silicon, or another material has a top surface and a bottom surface. A sensing element, bond pads, and perhaps ancillary circuitry are on the top surface. The ancillary circuitry can comprise resistors, capacitors, inductors, transistors, amplifiers or other circuit elements.

It is also an aspect of the embodiments that an inlet hole and an outlet hole pass from the top surface to the bottom surface. A top cap is positioned over the inlet hole, outlet hole, and sensing element so that a fluid can flow into the inlet hole, past the sensing element, and out the outlet hole. As such, the wire bond pads and ancillary circuits are not exposed to the fluid. The top cap can be silicon, glass, or another material. The sensing element can be a flow sensing element.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

A MEMS flow sensor has a flow channel that avoids wire bond pads and ancillary circuit elements. A fluid can move from the bottom of the sensor substrate, though an inlet hole, over a sensing element on the top of the substrate, and then through an outlet hole. The inlet hole and the outlet hole can pass from the substrate top to the substrate bottom. A top cap can be fixed to the top of the substrate such that it covers the sensing element, the inlet hole, and the outlet hole. The top cap constrains the flow channel and keeps fluid, either gaseous or liquid, from exiting the channel and contacting the wire bond pads or ancillary circuit elements.

Figure 1:
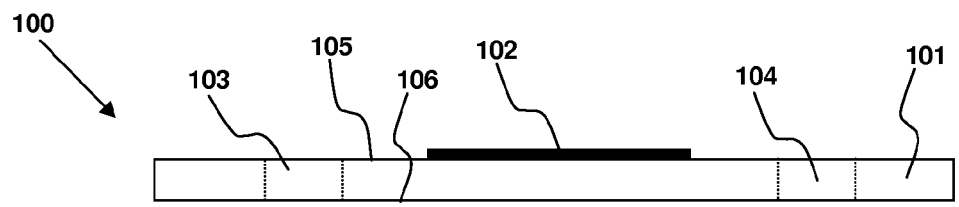
FIG. 1 illustrates a side view of a substrate in accordance with aspects of the embodiments.

FIG. 1 illustrates a side view of a substrate 101 in accordance with aspects of the embodiments. A sensor die 100 has a substrate 101 has a top surface 105 and a bottom surface 106. A sensing element 102 is on the top surface. An inlet hole 103 and an outlet hole 104 pass from the top surface 105 to the bottom surface 106.

Figure 2:
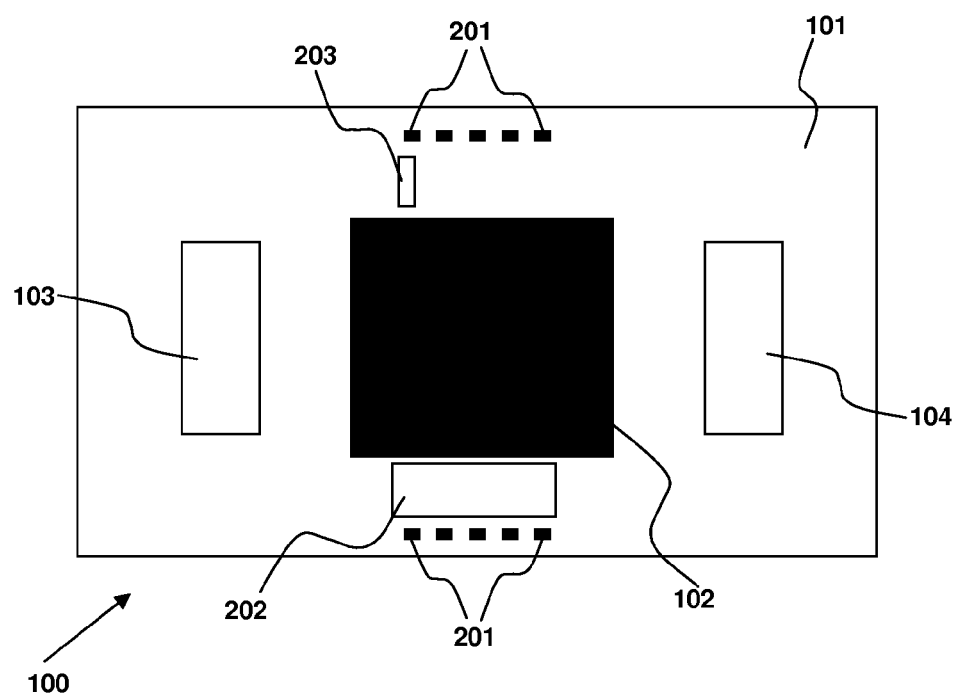
FIG. 2 illustrates a top view of a substrate in accordance with aspects of the embodiments.

FIG. 2 illustrates a top view of a substrate 101 in accordance with aspects of the embodiments. Wire bond pads 201 are also present on the top surface. An ancillary circuit 202 can connect the sensing element 102 to the wire bond pads 201. The ancillary circuit 202 can include resistors, amplifiers, and transistors. For example, a resistor 203 lie between the sensing element 102 and the wire bond pads 201. Wires (not shown) on the top surface create electrical connections amongst the sensing element 102, ancillary circuit 202, resistor 203, and wire bond pads 201.

Figure 3:
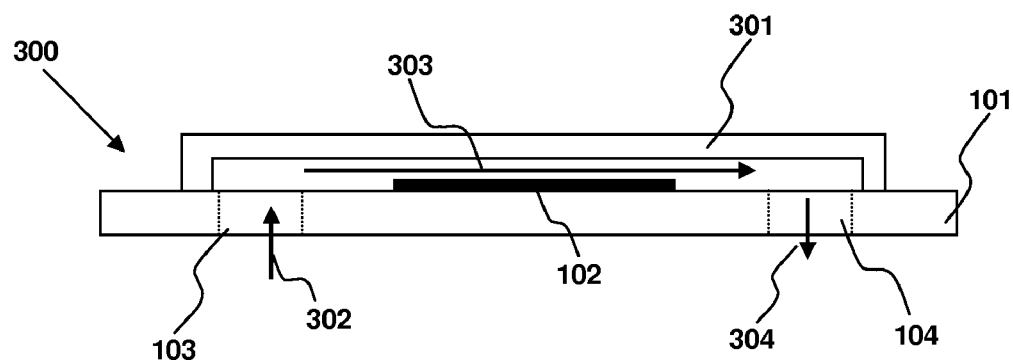
FIG. 3 illustrates a cut side view of a substrate with a top cap in accordance with aspects of the embodiments.

FIG. 3 illustrates a cut side view of a substrate 101 with a top cap 301 in accordance with aspects of the embodiments. A MEMS sensor die 300 has a flow channel that passes though the inlet hole 103, under the top cap 301, and out the outlet hole 104. As such the inflowing fluid 302 enters the inlet hole 103. The fluid 303 then flows passes, and is sensed by, the sensing element. The outflowing fluid 304 exits through the outlet hole 104. The top cap 301 prevents the fluid 303 from contacting the wire bond pads or any other circuitry that may be sensitive to or corroded by the fluid 303. The sensing element 102 is sensitive to the fluid 303 and can detect fluid flow rate, temperature, viscosity, chemical composition, conductivity, or another property of the fluid.

Figure 4:
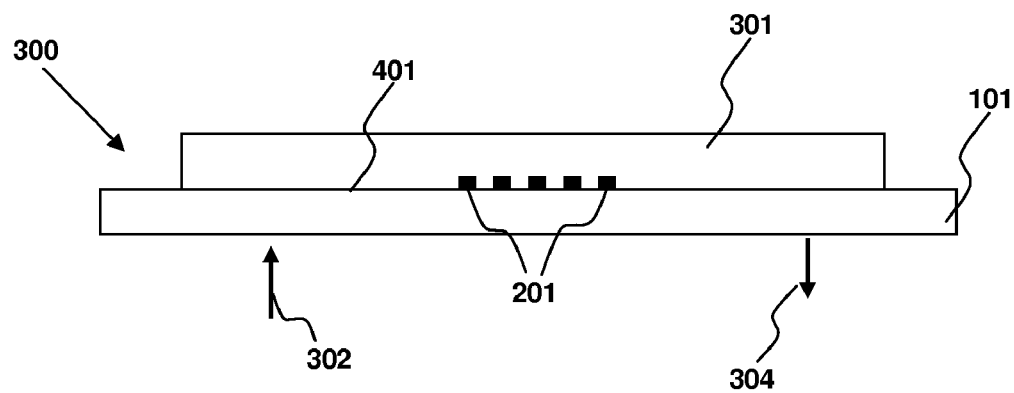
FIG. 4 illustrates a side view of a substrate with a top cap in accordance with aspects of the embodiments.

FIG. 4 illustrates a side view of a substrate 101 with a top cap 301 in accordance with aspects of the embodiments. In contrast with FIG. 3, FIG. 4 is not a cut view. As such, the sensing element is not visible because it is completely under the top cap 301. Some of the wire bond pads 201, however, are visible because the top cap 301 does not cover them. The top cap 301 is fixed to the substrate 101 by a joint 401. The joint 401 can be formed by an adhesive, anodic bonding, a glass frit process or by any other means for attaching the top cap 301 to the substrate 101. Those practiced in the art of processing semiconductor wafers are familiar with adhesives, anodic bonding, and glass frit processes.

For example, an electrostatic or anodic bond can be obtained when silicon and glass such as, for example, borosilicate glass having low expansion properties is placed together and exposed to a combination of heat and voltage. The voltage enables the free oxygen to molecularly bond to the underlying silicon. The silicon dioxide films are ordinarily removed from the silicon regions being anodically or electrostatically bonded.

Figure 5:
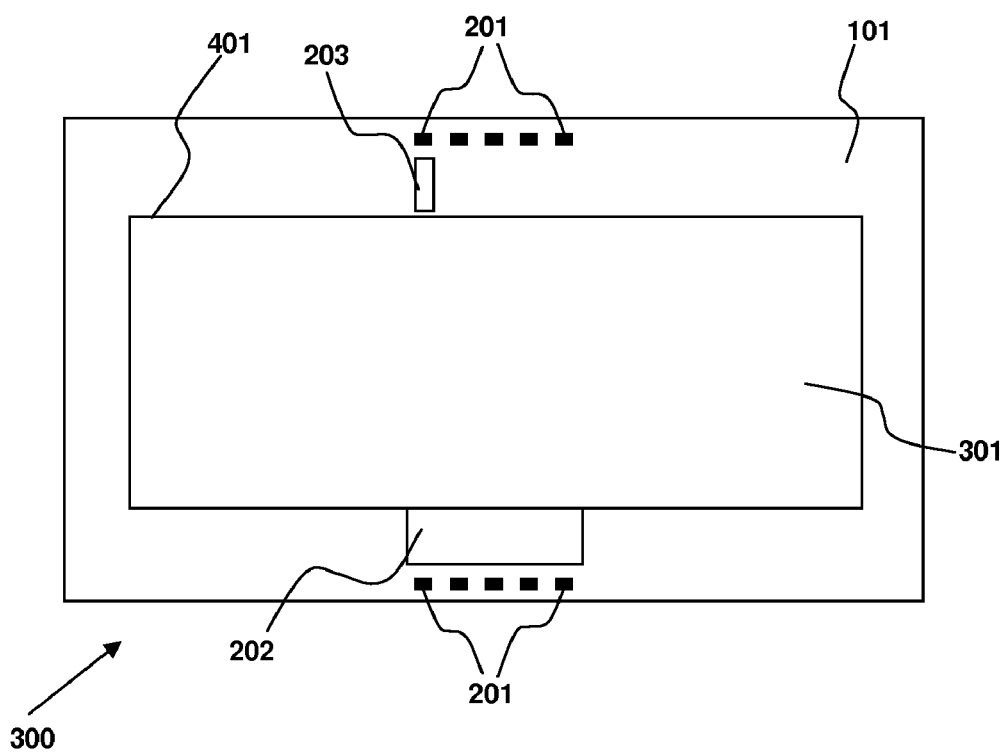
FIG. 5 illustrates a top view of a substrate with a top cap in accordance with aspects of the embodiments.

FIG. 5 illustrates a top view of a substrate 101 with a top cap 301 in accordance with aspects of the embodiments. The top cap 301 is seen to completely cover the sensing element, the inlet hole, and the outlet hole. The wire bond pads 201, ancillary circuit 202, and resistor 203, however, are not covered by the top cap 301. In some embodiments, the ancillary circuit 202 and resistor 203 can lie either completely or partially under the top cap 301 because a passivation layer can overlie them. The wire bond pads 201 can not be passivated because they are attachment points for external circuitry and thereby do not underlie the top cap 301. Those practiced in the arts of semiconductor processing, MEMS processing, and solid state circuitry are familiar with passivation and passivation layers.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Having thus described the invention what is claimed is:

1. A system comprising:
    a substrate having a top surface and a bottom surface;
    a sensing element electrically connected to a plurality of wire bond pads on the top surface;
    an inlet hole and an outlet hole that pass through the substrate from the top surface to the bottom surface; and
    a top cap fixed to the top surface wherein the top cap covers the inlet hole, the sensing element, and the outlet hole such that a fluid flowing into the inlet hole flows over the sensing element and out of the outlet hole and wherein the top cap prevents the fluid from contacting the wire bond pads.

2. The system of claim 1 wherein the top cap is glass.

3. The system of claim 2 wherein the substrate is silicon.

4. The system of claim 2 wherein the substrate is quartz.

5. The system of claim 2 wherein the substrate is glass.

6. The system of claim 2 wherein the substrate is glass and wherein the top cap is fixed to the substrate by a glass bond such as the glass bond produced by a glass frit process.

7. The system of claim 1 further comprising an ancillary circuit on the top surface electrically connecting the sensing element to the wire bond pads wherein the ancillary circuit comprises at least one resistor.

8. The system of claim 7 wherein the top cap prevents the fluid from contacting the at least one resistor.

9. The system of claim 1 wherein the top cap is silicon.

10. A system comprising:
    a substrate having a top surface and a bottom surface;
    a flow sensing element electrically connected to a multiplicity of wire bond pads on the top surface;
    an inlet hole and an outlet hole that pass through the substrate from the top surface to the bottom surface; and
    a top cap fixed to the top surface wherein the top cap covers the inlet hole, the flow sensing element, and the outlet hole such that a fluid flowing into the inlet hole flows over the sensing element and out of the outlet hole and wherein the top cap prevents the fluid from contacting the wire bond pads.

11. The system of claim 10 further comprising an ancillary circuit on the top surface electrically connecting the sensing element to the wire bond pads wherein the ancillary circuit comprises at least one resistor.

12. The system of claim 11 wherein the top cap is glass.

13. The system of claim 11 wherein the substrate is quartz.

14. The system of claim 11 wherein the substrate is silicon.

15. The system of claim 11 wherein the top cap is sealed to the top surface such that all the fluid entering the inlet hole exits the outlet hole.

16. The system of claim 10 wherein the top cap is sealed to the top surface such that all the fluid entering the inlet hole exits the outlet hole.

17. The system of claim 16 wherein the top cap is glass.

18. The system of claim 16 wherein the substrate is quartz.

19. The system of claim 16 wherein the substrate is silicon.

20. The system of claim 16 wherein the substrate is glass.

* * * * *